United States Patent [19]

Ruplen

[11] 4,147,129
[45] Apr. 3, 1979

[54] ANIMAL PLATFORM

[76] Inventor: Norman P. Ruplen, 3, Orchard Hill, Hamilton, Ontario, Canada, L8P 2V6

[21] Appl. No.: 817,214

[22] Filed: Jul. 20, 1977

[51] Int. Cl.² ............................................. A01K 29/00
[52] U.S. Cl. .......................................... 119/1; 119/19; 119/29; 119/122
[58] Field of Search ....................... 119/1, 19, 29, 122, 119/123, 120, 109

[56] References Cited

U.S. PATENT DOCUMENTS

| | | | |
|---|---|---|---|
| 2,671,427 | 3/1954 | Fell | 119/1 |
| 2,775,222 | 12/1956 | Kruck | 119/1 |
| 3,386,417 | 6/1968 | Machowski | 119/1 |
| 3,716,029 | 2/1973 | Pillsbury, Jr. | 119/29 |

FOREIGN PATENT DOCUMENTS

| | | | |
|---|---|---|---|
| 920625 | 11/1954 | Fed. Rep. of Germany | 119/109 |
| 506795 | 6/1939 | United Kingdom | 119/1 |

*Primary Examiner*—Jay N. Eskovitz
*Attorney, Agent, or Firm*—Hirons & Rogers

[57] ABSTRACT

An animal platform that will permit a tetherable domestic animal such as a dog to be comfortably and conveniently housed in a room consists of a flat sheet member having means for tethering the animal thereto to move only within the boundary of the platform. The platform also provides on its upper surface a sleeping station and a toilet station. The sleeping station has for example a plurality of reinforced apertures through which a sleeping blanket can be laced to the upper surface. The toilet station includes a frame by which a sheet of absorbent material, such as newspaper, can be removably fastened to the platform. The platform preferably is formed in parts which are pivoted or hinged together in overlapping relationship and movable between an open operative position and a closed, fully-overlapping stored position. In a pivotally-conected version the pivot member may also serve to attach the animal tether to the platform.

17 Claims, 7 Drawing Figures

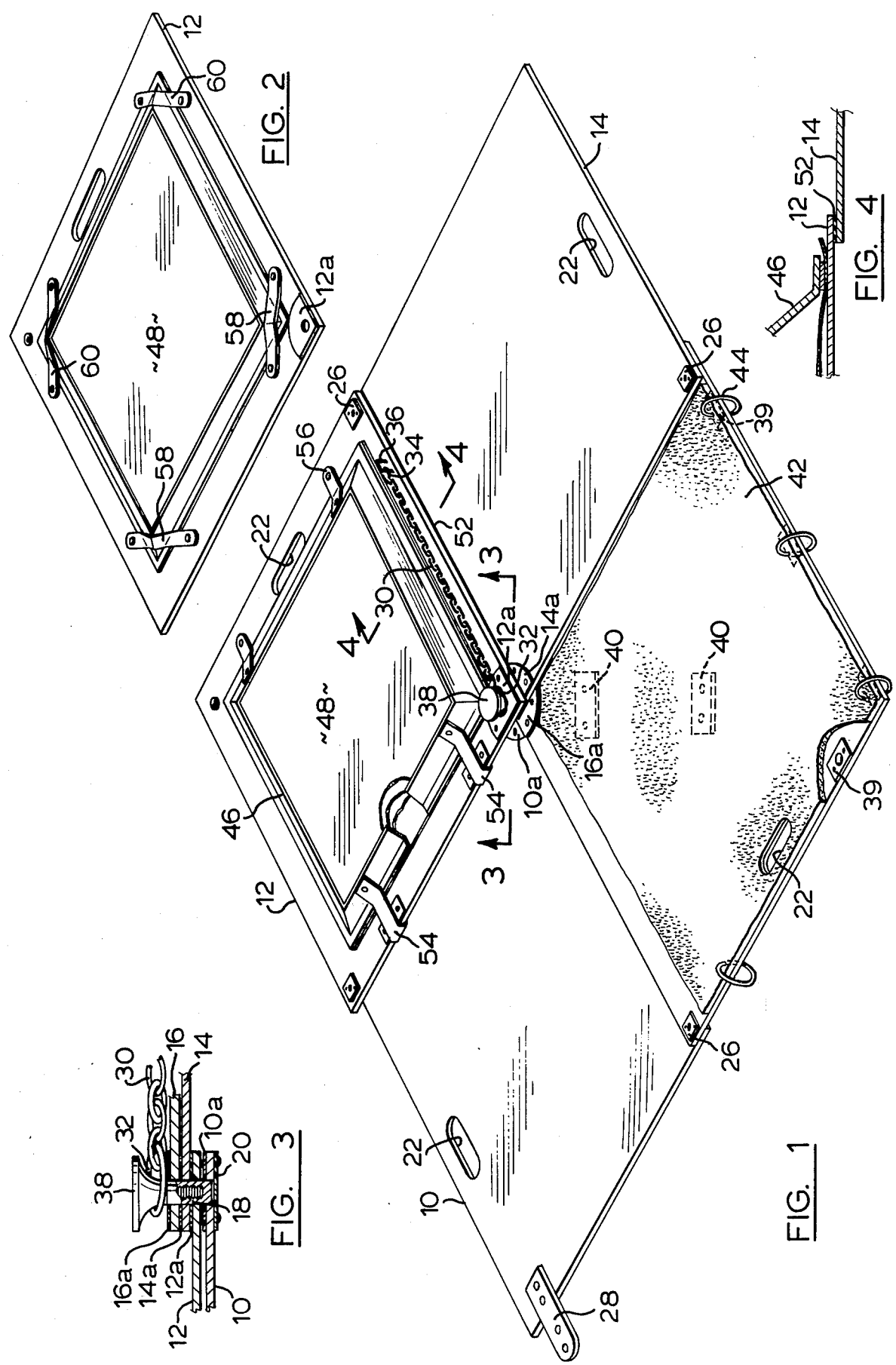

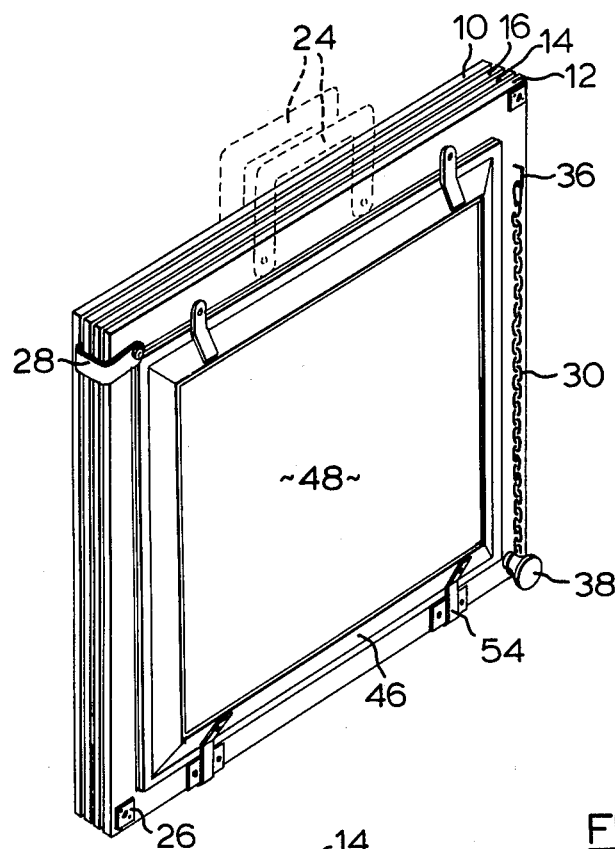
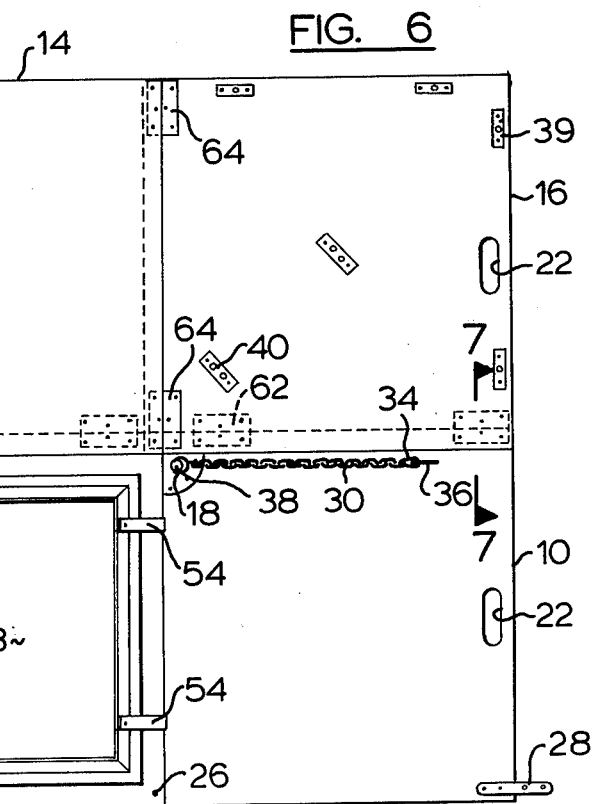
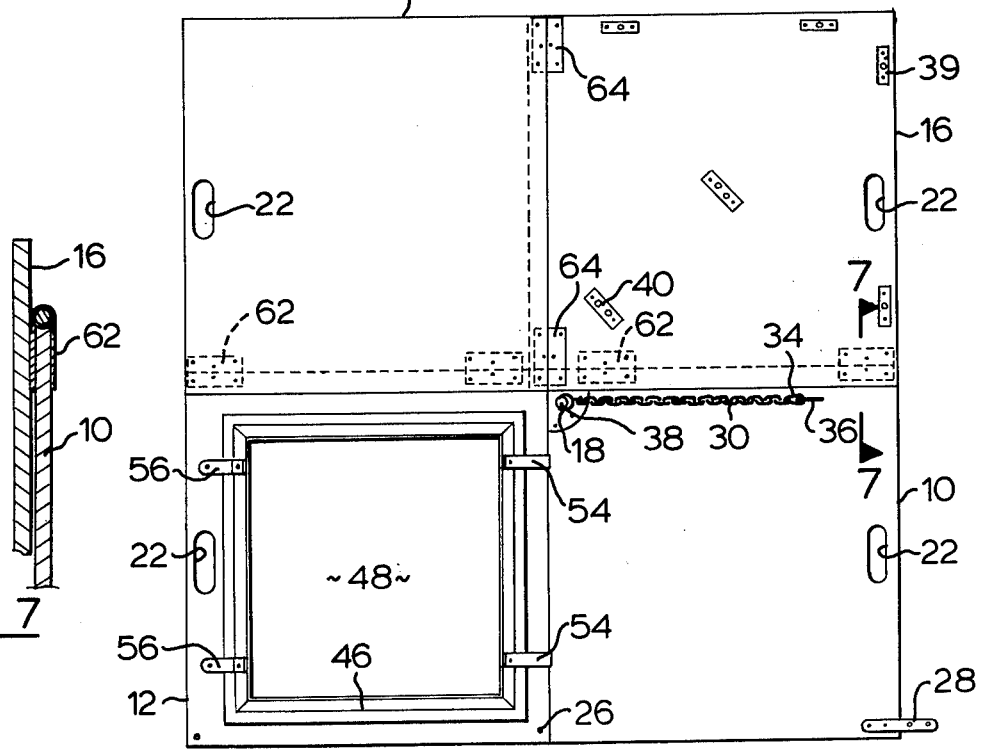

ANIMAL PLATFORM

FIELD OF THE INVENTION

The present invention is concerned with an animal platform, to which an animal can be tethered.

REVIEW OF THE PRIOR ART

The housing and care of animals in an urban environment, particularly of small domestic animals such as dogs, presents many problems. Most condominium and rental units have strict regulations for the control of animal pets, to prevent them wandering in the building and causing unwanted noises and odors. The usual solution is to permit the pet to have the run of at least part of the unit, with the hope that its toilet training is adequate, and that it will not become agitated to the extent that it will cause damage to furniture and/or make excessive noise.

There is disclosed and claimed in U.S. Pat. No. 3,716,029 issued 13th Feb., 1973 to C. H. Pillsbury an animal exercising device comprising a platform of a plurality of rigid sheets arranged to lie flat or to overlie one another. A housing is mounted on the platform and encloses an electric motor arranged to drive a head carrying animal leashes at the end of arms thereon. The animal is attached to a leash and caused to walk in a circular path on the platform when the motor is energised.

DEFINITION OF THE INVENTION

It is therefore the principal object of the invention to provide an animal platform of new form that can be located in a room and will permit the tethering of an animal thereto for relatively long periods of time.

It is another object to provide an animal platform permitting the effective housing of small domestic animals within a room of a building.

It is a further object to provide an animal platform that is readily portable from place to place.

In accordance with the present invention there is provided an animal platform comprising:

a plurality of platform parts mountable on a floor and pivoted together for movement between an open operative position in which they provide a platform having an upper surface on which the animal can move about the platform and a closed overlapping storage position, the said platform parts all overlapping one another at a central part of the platform in said open operative position, a pivot member passing through the central part of the platform and connecting the platform parts together, means on the upper surface of one platform part providing a sleeping station for the animal, means on the upper surface of another platform part providing a toilet station for the animal, and means for tethering the animal to the platform for movement within the outer boundary of the platform freely between the said stations, and also on parts of the platform not occupied by the stations.

In an alternative structure four platforms are provided arranged in two pairs with one pair hingedly connected to the other pair, and with the two parts of each pair hingedly connected to one another to be foldable about the hinges to the said closed overlapping storage position.

DESCRIPTION OF THE DRAWINGS

Animal platforms which are particular preferred embodiments of the invention will now be described, by way of example, with reference to the accompanying diagrammatic drawings, wherein:

FIG. 1 is a perspective view of a first embodiment in fully open operative condition, FIG. 2 is a similar view of a part only of the embodiment of FIG. 1 to show an alternative construction of a detail, FIGS. 3 and 4 are sections taken respectively on the lines 3—3 and 4—4 of FIG. 1, FIG. 5 is a similar view to FIG. 1 showing the first embodiment in a closed storage condition ready for transportation, FIG. 6 is a plan view of a second embodiment in the fully open operative condition, and FIG. 7 is a section taken on the line 7—7 of FIG. 6, but with the parts shown in folded-together position.

Similar parts are given the same reference in all the Figures of the drawing.

DESCRIPTION OF THE PREFERRED EMBODIMENTS

The first embodiment illustrated by FIGS. 1-5 has a flat sheet member constituted by four platform parts 10 through 16, which in the fully open position shown in FIG. 1 overlap one another edge over edge and are pivotally connected together by a vertical pin 18. This pin is connected to a base plate 20 fastened to the under surface of the part 10, and extends through a respective corner reinforcing member 10a, 12a, 14a and 16a provided for each platform part. The parts are pivotable about the pin 18 from the open operative position of FIG. 1 to the closed storage position of FIG. 5, and in the latter position handle apertures 22 in the different parts register with one another to permit the platform to be grasped easily for carriage. As illustrated in broken lines in FIG. 5 two additional or alternative handles 24 may be provided attached to the upper surface of the part 12 and the upper surface of the part 10. The platform is retained in the fully open position by snap fasteners 26 of any suitable type provided between the overlapping portions of the platform parts as close as possible to their outer edges. The platform parts are retained in the closed position by one or more flexible straps 28 fastened permanently to the upperside of the part 10 and fastenable by snap fasteners to the upper surface of the part 12.

The animal is tethered to the platform by a tether 30, consisting for example, of a length of chain that is fastened at one end to a loop 32 around the pin 18, and has a snap-link 34 at the other end. The length of the tether is just such that the animal is confined to walk on the upper surface of the platform, but is quite free to walk to any part thereof at will. The tether is retained neatly for storage by snapping the link 34 on a loop 36 protruding from the upper surface of the part 12. The pin 18 thus serves a double function and is provided with a removable enlarged head 38 to permit the tether to be removed and replaced.

The platform is provided on the upper surfaces of the opposite parts 12 and 16 respectively with a toilet station and a sleeping station for the animal, leaving the intervening opposite parts completely free. The sleeping station is established by means of a plurality of apertured metal reinforcing members 39 and 40, by which a sleeping blanket 42 can be securely laced to the upper surface of the part 16, and so that it cannot be bunched up by the animal. Thus each member 39 is provided closely adjacent the part edge and provides a single aperture through which a loop 44 can be passed around the edge. Each member 40 is provided within the sleeping station well away from the edge and requires two apertures to permit the loop 44 to be employed. If the blanket is not too thick it can be left in place while the platform is folded to the stored position.

The toilet station is established by means of an open frame member 46 which is removably fastened to the upper surface of the part 12, so that the platform can be folded without the need for its removal. This frame is arranged to trap between its lower edge and the platform upper surface one or more layers 48 of suitable absorbent material, such as newspaper, that can be discarded when soiled. The frame lower edge is provided with a seal strip 50 which presses against the layer or layers 48 to prevent escape of liquid from within the frame. In case this should fail, or the animal should fail to use the toilet station, seal strips 52 are provided between the overlapping edges of the platform parts to prevent escape of liquid to the floor on which the platform stands. In the embodiment of FIG. 1 the frame 46 is fastened securely to the part 12 by two hooked members 54 which engage over the part edge, and by two oppositely-disposed strap members 56 which are snap-fastened to the part upper surface. In the embodiment illustrated by FIG. 2 the frame is retained by two fixed corner straps 58 and by two flexible corner straps 60 permanently fastened at one end and snap fastened at the other end.

The platform is easily carried to the place of use in the folded condition of FIG. 5 and then opened to the condition of FIG. 1. The bed blanket can quickly be laced into place, if it is not already in place, and upon the placement of the absorbent sheets 48 beneath the frame it is ready for immediate occupancy by the animal.

In the embodiment of FIGS. 6 and 7 the platform parts also overlap one another, but are hinged to one another by hinges arranged to accommodate a panel of the thickness of the platform parts between their leaves when closed, so that the leaves can be moved to the parallel position, as shown by FIG. 7. The two parts 10 and 16 constitute a pair which are hinged to one another by two spaced hinges 62, while the parts 12 and 14 constitute another such pair. The pair 10/16 is then hinged to the pair 12/14 by hinges 64 between the parts 14 and 16 only. The junction between parts 12 and 16 must be mitred as indicated so that part 12 can rest along with part 16 on top of part 10 without parts 12 and 16 overlapping one another. The embodiment is moved from the operative condition illustrated to the closed position by lifting parts 12 and 14 together until they are at right angles to the parts 10 and 16 and then folding 12 and 14 back to back; the two parts are then folded about hinges 64 until part 14 is face-to-face with part 16; thereafter the part 10 is folded about hinges 62 back-to-back with part 16. The procedure is of course reversed to open the platform. The tether pin 18 is fastened to the part 10 as close as possible to the junction of the four parts.

In an alternative embodiment which is not specifically illustrated the platform parts are pivoted to one another at their outer edges for movement between the operative and storage positions. Thus, parts 14 and 16 are pivoted together in this manner, as are parts 16 and 10, and parts 10 and 12, no pivot being required between parts 12 and 14. Latches are provided at the center to hold the parts in the required operative positions.

I claim:

1. An animal platform comprising:
    a plurality of platform parts mountable on a floor and pivoted together for movement between an open operative position in which they provide a platform having an upper surface on which the animal can move about the platform and a closed overlapping storage position, the said platform parts all overlapping one another at a central part of the platform in said open operative position, a pivot member passing through the central part of the platform and connecting the platform parts together,
    means on the upper surface of one platform part providing a sleeping station for the animal,
    means on the upper surface of another platform part providing a toilet station for the animal, and
    means for tethering the animal to the platform for movement within the outer boundary of the platform freely between the said stations, and also on parts of the platform not occupied by the stations.

2. An animal platform as claimed in claim 1, and comprising four platform parts, wherein the platform parts providing the sleeping and toilet stations are disposed oppositely to one another in the said open operative position, so as to be spaced from each other by an unoccupied intervening platform part.

3. An animal platform as claimed in claim 1, wherein the said pivot member also serves for fastening to the platform the said means for tethering the animal thereto.

4. An animal platform as claimed in claim 1, wherein the said platform parts are provided with edge sealing means which with the platform in open operative position are disposed between adjacent overlapping platform part edges to prevent leakage of liquid therebetween.

5. An animal platform as claimed in claim 1, wherein the said platform parts are provided with respective handle means which register with one another in said overlapping storage position for handling of the platform.

6. An animal platform as claimed in claim 1, wherein means providing the sleeping station comprise a plurality of apertures in the respective platform part through which a flat blanket can be laced to the platform part.

7. An animal platform as claimed in claim 1, wherein means providing the toilet station comprise an open frame member attached to the respective platform part to removably retain thereon a sheet of absorbent material.

8. An animal platform as claimed in claim 1, wherein the said toilet station is provided on a platform part that is an outer-most part when the platform parts are in the said closed storage position with the said upper surface facing outwards, and the means providing the toilet station comprise an open frame member attached to the platform upper part surface to removably retain thereon a sheet of absorbent material.

9. An animal platform as claimed in claim 1, including a loop protruding from the upper surface of a platform part that is an outermost part when the platform parts are in the said closed storage position, the loop being spaced from the point of attachment of the said tethering means to the platform and to which the said tethering means is secured for storage thereof.

10. An animal platform comprising:

four platform parts mountable on a floor and hinged together for movement between an open operative position in which they provide a platform having an upper surface on which the animal can move about the platform, and a closed overlapping storage position, the said platform parts being arranged in two pairs with one pair hingedly connected to the other pair, and with the two parts of each pair hingedly connected to one another to be foldable about the hinges to the said storage position, means on the upper surface of one platform part providing a sleeping station for the animal, means on the upper surface of another platform part providing a toilet station for the animal, and means for tethering the animal to the platform for movement within the outer boundary of the platform freely between the said stations, and also on parts of the platform not occupied by the stations.

11. An animal platform as claimed in claim 10, wherein the platform parts providing the sleeping and toilet stations are disposed oppositely to one another in the said open operative position, so as to be spaced from each other by an unoccupied intervening platform part.

12. An animal platform as claimed in claim 10, wherein the said platform parts are provided with edge sealing means which with the platform in open operative position are disposed between adjacent abutting platform part edges to prevent leakage of liquid therebetween.

13. An animal platform as claimed in claim 10, wherein the said platform parts are provided with respective handle means which register with one another in said overlapping storage position for handling of the platform.

14. An animal platform as claimed in claim 10, wherein means providing the sleeping station comprise a plurality of apertures in the respective platform part through which a flat blanket can be laced to the platform part.

15. An animal platform as claimed in claim 10, wherein means providing the toilet station comprise an open frame member attached to the respective platform part to removably retain thereon a sheet of absorbent material.

16. An animal platform as claimed in claim 10, wherein the said toilet station is provided on a platform part that is an outermost part when the platform parts are in the said closed storage position with the said upper surface facing outwards, and the means providing the toilet station comprise an open frame member attached to the platform upper part surface to removably retain thereon a sheet of absorbent material.

17. An animal platform as claimed in claim 10, including a loop protruding from the upper surface of a platform part that is an outermost part when the platform parts are in the said closed storage position, the loop being spaced from the point of attachment of the said tethering means to the platform and to which the said tethering means is secured for storage thereof.

* * * * *